United States Patent [19]

Dumbreck et al.

[11] Patent Number: 4,725,863
[45] Date of Patent: Feb. 16, 1988

[54] STEREO CAMERA

[75] Inventors: Andrew A. Dumbreck, Abingdon; Stephen P. Murphy, Wantage, both of England

[73] Assignee: United Kingdom Atomic Energy Authority, London, England

[21] Appl. No.: 16,890

[22] Filed: Feb. 20, 1987

[51] Int. Cl.⁴ .............................................. G03B 35/08
[52] U.S. Cl. .................... 354/113; 350/255; 352/57; 352/59; 352/60; 358/88; 358/213.13; 358/227
[58] Field of Search ............... 354/111, 112, 113, 114, 354/115, 116; 352/57, 59, 60; 350/130, 142, 247, 255; 358/88, 92, 209, 213.13, 227

[56] References Cited

U.S. PATENT DOCUMENTS

| | | | |
|---|---|---|---|
| 1,922,963 | 8/1933 | Lane | 354/114 |
| 2,417,446 | 3/1947 | Reynolds | 358/92 |
| 2,601,086 | 6/1952 | Bucky | 354/111 |
| 2,706,938 | 4/1955 | Kiel | 354/113 |
| 3,115,816 | 12/1963 | Muller | 354/114 |
| 3,251,284 | 5/1966 | Ratliff | 354/115 |
| 3,457,364 | 7/1969 | Carrillo | 358/92 |
| 3,784,738 | 1/1974 | Natter | 358/88 |
| 3,953,869 | 4/1976 | Lo et al. | 354/115 |
| 4,559,555 | 12/1985 | Schoolman | 358/88 |

FOREIGN PATENT DOCUMENTS

| | | |
|---|---|---|
| 31170 | 4/1885 | Fed. Rep. of Germany . |
| 877246 | 5/1953 | Fed. Rep. of Germany . |
| 169249 | 6/1920 | United Kingdom . |
| 775606 | 5/1957 | United Kingdom . |
| 584278 | 1/1978 | U.S.S.R. . |

*Primary Examiner*—A. A. Mathews
*Attorney, Agent, or Firm*—William R. Hinds

[57] ABSTRACT

A stereoscopic camera with two lenses, in which each lens is supported by a support table fixed rigidly to two parallel resilient plates. Simultaneous focussing and convergence of the lenses is brought about by a cam urging the plates to bend, thereby constraining both lenses to follow the required straight line loci.

6 Claims, 3 Drawing Figures

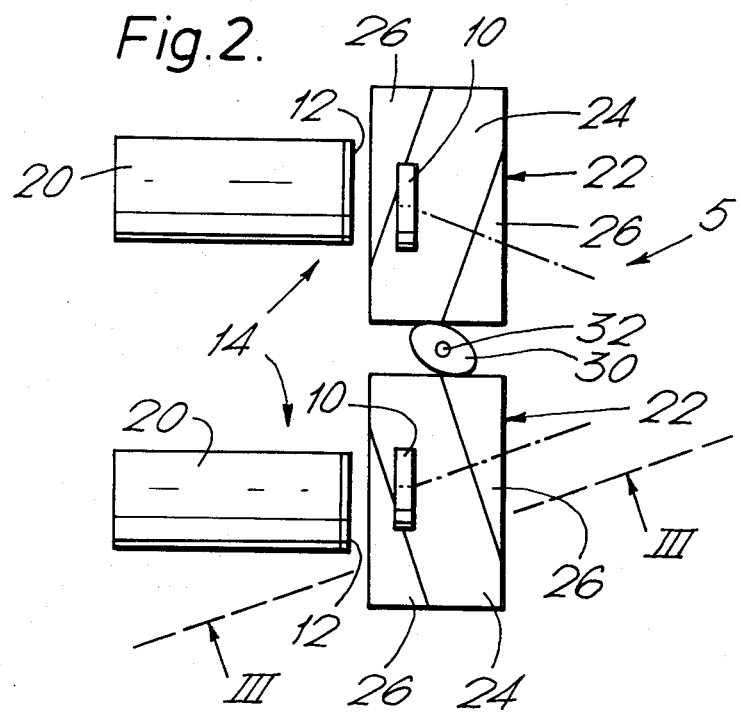
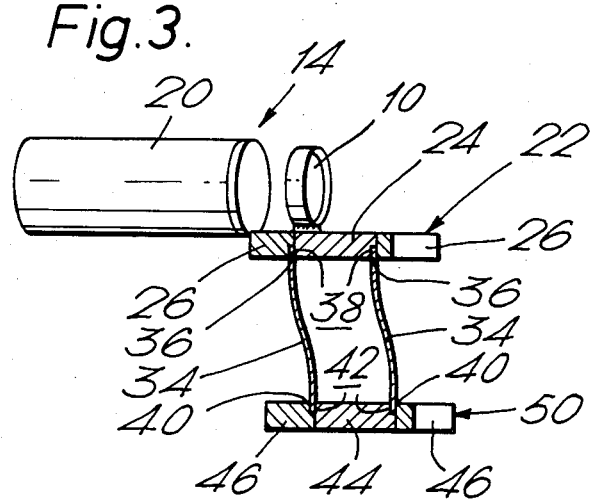

STEREO CAMERA

This invention relates to a stereo camera, that is a camera with two spaced-apart camera units for taking stereoscopic pictures of an object.

Where it is desired to use a stereo camera to view objects at different distances away from the camera not only must the lenses of both the camera units be moved to focus the images of the object, but also the optical axes of the two camera units must be converged on the object. The convergence may be brought about by turning the camera units as a whole, or alternatively by moving the lenses alone. It is preferable for the focussing to be brought about simultaneously with the convergence, and especially where a stereo camera may be tilted away from the horizontal it is advantageous to minimise any play in the focussing and convergence mechanisms. A stereo camera mechanism in which the lenses are moved to accomplish both focussing and convergence is described for example in US 2 601 086. This mechanism is quite complex; and as it includes several relatively movable components, it consequently has more play than is acceptable for some purposes.

According to the present invention there is provided a stereo camera comprising two spaced-apart camera units each including a lens, each lens being movable along a respective substantially straight line locus to achieve simultaneous convergence and focussing of the camera units, wherein each lens is mounted on a respective support means fixed rigidly to resilient plate means oriented so that bending of the plate means constrains the lens to follow the said locus, and means are provided for urging the resilient plate means to bend.

Desirably the urging means comprises means pushing on both the support means, and may comprise a continuously rotatable cam or a pair of mechanically connected cams. Desirably, for all positions of the cam or cams the two support means are resiliently urged by the plate means into contact with the cam or cams.

The invention thus provides a relatively simple mechanism for simultaneous focussing and convergence of the lenses of a stereo camera, and because the resilient plate means can be prestressed, the mechanism may be substantially without play.

The invention will now be further described by way of example only and with reference to the accompanying drawings in which:

FIG. 2 shows a diagrammatic plan view of the stereoscopic camera of FIG. 1; and

FIG. 3 shows a sectional view on the line III—III of FIG. 2.

Figure 1:
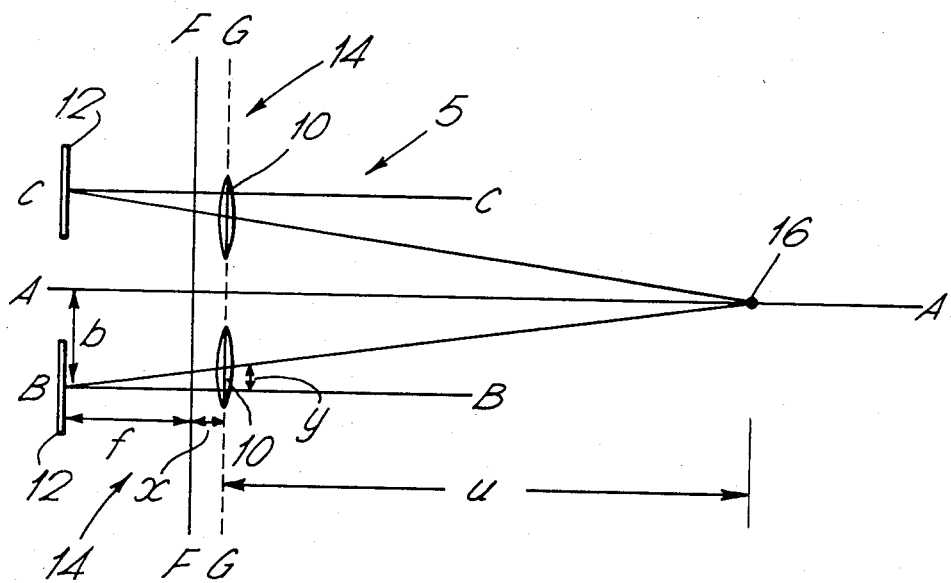
FIG. 1 shows a diagram of a stereoscopic television camera.

Referring to FIG. 1, a stereoscopic television camera 5 has two lenses 10 and two image detecting elements 12 symmetrically disposed on opposite sides of the axis A—A of the camera 5 so forming two spaced-apart camera units 14. The centre of each element 12 is at a distance b from the axis A—A. If the camera 5 were focussed on a far object the optical axes of the lenses 10 would be the parallel lines B—B and C—C, and the lenses 10 would lie in the plane F—F at a distance f from the elements 12; but if, as shown, the camera 5 is to view an object 16 which is relatively close, the lenses 10 are moved a distance x further from the elements 12 in order to provide a focussed image, and are moved a distance y nearer to the axis A—A in order to converge on the object 16. The lenses 10 thus lie on the plane G—G at a distance u from the object 16.

The distance y is given by the equation:

$$\frac{y}{f+x} = \frac{b}{f+u+x}$$

and the distance x by the equation:

$$\frac{1}{f} = \frac{1}{u} + \frac{1}{f+x}$$

Consequently:

$$y = \frac{bx}{f+x},$$

which if x is much less than f simplifies to:

$$y = \frac{bx}{f}$$

Thus the positions of the lenses 10 for viewing objects 14 at different distances lie on respective straight line loci at an angle $\tan^{-1} b/f$ to the axis A—A of the camera 5.

Referring now to FIG. 2, which shows the stereoscopic television camera 5 of FIG. 1 in more detail, the image detecting element 12 of each camera unit 14 is defined by the light-sensitive end of a respective vidicon tube 20, and the lens 10 of each camera unit 14 is supported by a respective rectangular support table 22. Each support table 22 comprises a central polygonal portion 24 onto which the lens 10 is mounted, and two triangular portions 26 connected to the central portion 24 by recessed bolts (not shown). The edges along which the central portion 24 and the triangular portions 26 abut are parallel to each other, and are perpendicular to the required straight line locus of the lens 10, which is indicated by a chain dotted line. Between the two support tables 22 is an elliptical cam 30 on a shaft 32, the cam 30 bearing against the side of each table 22.

Referring now to FIG. 3, in which only the camera unit 14 through which the section passes is shown, each of the support tables 22 is supported by two resilient beryllium-copper plates 34, each of rectangular shape. The upper edge 36 of each plate 34 is clamped in a slot 38 between the abutting edges of the central portion 24 and one of the triangular portions 26. The lower edge 40 of each plate 34 is similarly clamped in a slot 42 between corresponding portions 44 and 46 of a rectangular base member 50 (not shown in FIG. 2). The base members 50 of each camera unit 14 are fixed relative to each other and relative to the vidicon tubes 20.

Owing to the flexibility of the plates 34, the support tables 22 and hence the lenses 10 can move in the direction of the respective straight line locus, with consequent bending of the plates 34. This movement is brought about by rotation of the cam 30. The plates 34 would be flat and under no bending stress if the tables 22 were at a separation less than the minimum width of the cam 30, so that the plates 34 are prestressed by the presence of the cam 30 between the tables 22. Hence for all positions of the cam 30 the plates 34 urge the tables 22 resiliently into contact with the cam 30, and there is no slack. Both the camera units 14 can thus simultaneously be focussed and converted onto an object by rotation of the shaft 32. The cam 30 is shaped to permit viewing of objects at any distance above 1 m from the lenses 10. For example if the lenses 10 are of focal length f=20 mm, the maximum displacement x required is 0.4 mm.

It will be appreciated that as the plates 34 bend, the lenses 10 follow an arcuate path in the plane perpendicular to the plane of the optical axes B—B and C—C; but the displacement in that plane corresponding to a displacement of 0.5 mm along the desired locus is only about 0.006 mm, if the plates 34 are 20 mm high. Thus the path followed by each lens 10 is substantially a straight line. Furthermore the displacement in that plane (which will produce a vertical displacement of the images, as viewed by an observer watching a stereoscopic television display) will be exactly the same for both lenses 10, and so will not cause any vertical discrepancy between the two images. It will be appreciated that any small vertical discrepancy between the two lenses would be considerably magnified on the television display, since the television screen height is typically about forty times the height of the image detecting element 12. Any such discrepancy must be avoided if the observer is to be able to fuse the two images into a single stereoscopic view.

It will also be understood that the lenses 10 should be chosen in accordance with the use to which the camera is to be put, taking into account the field of view needed, the range of distances at which the object may be located, and the expected level of illumination. The lenses might for example have focal lengths of 12.5 mm, or 50 mm. The shorter focal length lens provides a wider field of view, and requires less movement, especially the x movement, when the object distance varies between say infinity and 0.5 m, than does the longer focal length lens.

Although the camera 5 has been described as having a single cam 30 located between the two support tables 22, it will be appreciated that an alternative camera might include two cams (not shown) bearing against the rear edges of the tables 22, the cams being actuated by a common drive mechanism so as to move in synchronism. It will also be understood that the mechanism for bringing about simultaneous focussing and converging of the lenses 10 is applicable to still stereo cameras and to cine film stereo cameras as well as to the television stereo camera 5 described above.

We claim:

1. A stereo camera comprising two spaced-apart camera units each including a lens, each lens being movable along a respective substantially straight line locus to achieve simultaneous convergence and focussing of the camera units, wherein each lens is mounted on a respective support means fixed rigidly to resilient plate means oriented so that bending of the plate means constrains the lens to follow the said locus, and means are provided for urging the resilient plate means to bend.

2. A stereo camera as claimed in claim 1 wherein the urging means comprises means for pushing on both the two support means.

3. A stereo camera as claimed in claim 2 wherein the plate means are arranged so that, for all positions of the pushing means, the support means are resiliently urged into contact with the pushing means.

4. A stereo camera as claimed in claim 2 wherein the pushing means comprises a continuously rotatable cam.

5. A stereo camera as claimed in claim 2 wherein the pushing means comprises a pair of mechanically linked cams, one cam for pushing on each support means.

6. A stereo camera as claimed in claim 1 wherein the plate means comprises two spaced apart rectangular plates, whose upper edges and whose lower edges are parallel to each other, the upper edges are clamped to the respective lens support means and the lower edges are clamped to a base member.

* * * * *